US011976862B2

United States Patent
She et al.

(10) Patent No.: US 11,976,862 B2
(45) Date of Patent: May 7, 2024

(54) ELECTRICAL ARCHITECTURE FOR POWERING MULTIPLE TRANSPORT REFRIGERATION UNITS

(71) Applicant: CARRIER CORPORATION, Palm Beach Gardens, FL (US)

(72) Inventors: Xu She, Cohoes, NY (US); XuQiang Liao, Manlius, NY (US); Ruud van Wijk, Waddinxveen (NL); Peter van der Plas, Katwijk z/h (NL); Hiu Lam Kwok, Weehawken, NJ (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/702,464

(22) Filed: Mar. 23, 2022

(65) Prior Publication Data

US 2022/0307750 A1    Sep. 29, 2022

Related U.S. Application Data

(60) Provisional application No. 63/164,728, filed on Mar. 23, 2021.

(51) Int. Cl.
*F25B 49/02* (2006.01)
*B60H 1/00* (2006.01)
*B60H 1/32* (2006.01)

(52) U.S. Cl.
CPC ....... *F25B 49/025* (2013.01); *B60H 1/00428* (2013.01); *B60H 1/00814* (2013.01); *B60H 1/3232* (2013.01); *F25B 2600/021* (2013.01)

(58) Field of Classification Search
CPC ............ F25B 49/025; F25B 2600/021; B60H 1/00428; B60H 1/00814
See application file for complete search history.

(56) References Cited

U.S. PATENT DOCUMENTS

2017/0349078 A1    12/2017    Dziuba et al.

FOREIGN PATENT DOCUMENTS

| DE | 102014016939 A1 | 5/2016 |
|----|-----------------|--------|
| WO | 2018226848 A1   | 12/2018 |

(Continued)

OTHER PUBLICATIONS

European Search Report for Application No. 22161939.9; dated Aug. 22, 2022; 7 Pages.

*Primary Examiner* — Jonathan Bradford
(74) *Attorney, Agent, or Firm* — CANTOR COLBURN LLP

(57) ABSTRACT

A multi-unit transport refrigeration system including: a first transportation refrigeration unit configured to refrigerate a first transport container; a second transportation refrigeration unit configured to refrigerate a second transport container; and an energy management system including: an energy storage device configured to store electricity to power the first second transportation refrigeration unit; and a power conversion system electrically connecting the energy storage device to the first transportation refrigeration unit and the second transportation refrigeration unit, the power conversion system including: a first DC/DC converter configured to increase a voltage of the electricity received from the energy storage device from a first voltage to a second voltage; and a first DC/AC inverter configured to convert the electricity received from the first DC/DC converter from DC to AC and then convey the electricity to at least one of the first transportation refrigeration unit or the second transportation refrigeration unit.

14 Claims, 10 Drawing Sheets

(56) References Cited

FOREIGN PATENT DOCUMENTS

| WO | WO-2018226857 A1 | * | 12/2018 | ......... B60H 1/00428 |
|----|------------------|---|---------|------------------------|
| WO | 2020068556 A1 |   | 4/2020  | |
| WO | 2020142066 A1 |   | 4/2020  | |

* cited by examiner

ELECTRICAL ARCHITECTURE FOR POWERING MULTIPLE TRANSPORT REFRIGERATION UNITS

CROSS-REFERENCE TO RELATED APPLICATIONS

This application claims the benefit of U.S. Provisional Application Ser. No 63/164,728 filed Mar. 23, 2021, the disclosure of which is incorporated herein by reference in its entirety.

BACKGROUND

The embodiments herein generally relate to transport refrigeration systems and more specifically, the energy management of such transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicles or to the trailer in operative association with a cargo space defined within the vehicles or trailer for maintaining a controlled temperature environment within the cargo space.

Conventionally, transport refrigeration systems used in connection with refrigerated vehicles and refrigerated trailers include a transportation refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the transportation refrigeration unit, must be powered during transit by a prime mover. In mechanically driven transport refrigeration systems the compressor is driven by the prime mover, either through a direct mechanical coupling or a belt drive, and other components, such as the condenser and evaporator fans are belt driven.

Transport refrigeration systems may also be electrically driven. In an electrically driven transport refrigeration system, a prime mover carried on and considered part of the transport refrigeration system, drives an alternating (AC) synchronous generator that generates AC power. The generated AC power is used to power an electric motor for driving the refrigerant compressor of the transportation refrigeration unit and also powering electric AC fan motors for driving the condenser and evaporator motors and electric heaters associated with the evaporator. A more efficient method to power the electric motor is desired to reduce fuel usage.

BRIEF DESCRIPTION

According to one embodiment, a multi-unit transport refrigeration system is provided. The multi-unit transport refrigeration system including: a first transportation refrigeration unit configured to refrigerate a first transport container; a second transportation refrigeration unit configured to refrigerate a second transport container; and an energy management system including: an energy storage device configured to store electricity to power the first transportation refrigeration unit and the second transportation refrigeration unit; and a power conversion system electrically connecting the energy storage device to the first transportation refrigeration unit and the second transportation refrigeration unit, the power conversion system including: a first DC/DC converter configured to increase a voltage of the electricity received from the energy storage device from a first voltage to a second voltage; and a first DC/AC inverter configured to convert the electricity received from the first DC/DC converter from DC to AC and then convey the electricity to at least one of the first transportation refrigeration unit or the second transportation refrigeration unit.

In addition to one or more of the features described above, or as an alternative, further embodiments of the transport refrigeration system may include a first electrical connection electrically connecting the first DC/DC converter to the energy storage device.

In addition to one or more of the features described above, or as an alternative, further embodiments of the transport refrigeration system may include a second electrical connection electrically connecting the first DC/AC inverter to the first transportation refrigeration unit; a third electrical connection electrically connecting the first DC/AC inverter to the second transportation refrigeration unit; and a junction point configured to split the electricity exiting the first DC/AC inverter into the second electrical connection and the third electrical connection.

In addition to one or more of the features described above, or as an alternative, further embodiments of the transport refrigeration system may include a second DC/AC inverter configured to convert the electricity received from the first DC/DC converter from DC to AC and then convey the electricity to the second transportation refrigeration unit, wherein the second DC/AC inverter is in a second path and the first DC/AC inverter is in a first circuit path, and wherein the first DC/AC inverter is configured to convey the electricity to the first transportation refrigeration unit.

In addition to one or more of the features described above, or as an alternative, further embodiments of the transport refrigeration system may include a first electrical connection electrically connecting the energy storage device to the first DC/DC converter; and a junction point configured to split the electricity exiting the first DC/DC converter into the first DC/AC inverter and the second DC/AC inverter.

In addition to one or more of the features described above, or as an alternative, further embodiments of the transport refrigeration system may include: a second electrical connection electrically connecting the first DC/AC inverter to the first transportation refrigeration unit; and a third electrical connection electrically connecting the second DC/AC inverter to the second transportation refrigeration unit.

In addition to one or more of the features described above, or as an alternative, further embodiments of the transport refrigeration system may include a second DC/DC converter configured to increase the voltage of the electricity received from the energy storage device from the first voltage to a third voltage, wherein the second DC/DC converter is in a second circuit path and the first DC/DC converter is in a first circuit path; and a second DC/AC inverter configured to convert the electricity received from the second DC/DC converter from DC to AC and then convey the electricity to the second transportation refrigeration unit, wherein the second DC/AC inverter is in the second circuit path and the first DC/AC inverter is in the first circuit path, and wherein the first DC/AC inverter is configured to convey the electricity to the first transportation refrigeration unit.

In addition to one or more of the features described above, or as an alternative, further embodiments of the transport refrigeration system may include: a first electrical connection electrically connecting the energy storage device to the first DC/DC converter and the second DC/DC converter; and a junction point configured to split the electricity exiting the energy storage device into the first DC/DC converter and the second DC/DC converter.

In addition to one or more of the features described above, or as an alternative, further embodiments of the transport refrigeration system may include: a second electrical connection electrically connecting the first DC/AC inverter to the first transportation refrigeration unit; and a third electrical connection electrically connecting the second DC/AC inverter to the second transportation refrigeration unit.

According to another embodiment, a method of operating a multi-unit transport refrigeration system is provided. The method including: refrigerating a first transport container using a first transportation refrigeration unit; refrigerating a second transport container using a second transportation refrigeration unit; storing electricity to power the first transportation refrigeration unit and the second transportation refrigeration unit using an energy storage device; increasing, using a first DC/DC converter, a voltage of the electricity received from the energy storage device from a first voltage to a second voltage; and converting, using a first DC/AC inverter, the electricity received from the first DC/DC converter from DC to AC and conveying the electricity to at least one of the first transportation refrigeration unit or the second transportation refrigeration unit.

In addition to one or more of the features described above, or as an alternative, further embodiments of the transport refrigeration system may include conveying the electricity from the energy storage device to the first DC/DC converter using a first electrical connection.

In addition to one or more of the features described above, or as an alternative, further embodiments of the transport refrigeration system may include: conveying the electricity from the first DC/AC inverter to the first transportation refrigeration unit using a second electrical connection; conveying the electricity from the first DC/AC inverter to the second transportation refrigeration unit using a third electrical connection; and splitting the electricity exiting the first DC/AC inverter into the second electrical connection and third electrical connection using a junction point.

In addition to one or more of the features described above, or as an alternative, further embodiments of the transport refrigeration system may include: converting, using a second DC/AC inverter, the electricity received from the first DC/DC converter from DC to AC and conveying the electricity to the second transportation refrigeration unit, wherein the second DC/AC inverter is in a second circuit path and the first DC/AC inverter is in a first circuit path, and wherein the first DC/AC inverter is configured to convey the electricity to the first transportation refrigeration unit.

In addition to one or more of the features described above, or as an alternative, further embodiments of the transport refrigeration system may include: conveying the electricity from the energy storage device to the first DC/DC converter using a first electrical connection; and splitting the electricity exiting the first DC/DC converter into the first DC/AC inverter and the second DC/AC inverter using a junction point.

In addition to one or more of the features described above, or as an alternative, further embodiments of the transport refrigeration system may include: conveying the electricity from the first DC/AC inverter to the first transportation refrigeration unit using a second electrical connection; and conveying the electricity from the second DC/AC inverter to the second transportation refrigeration unit using a third electrical connection.

In addition to one or more of the features described above, or as an alternative, further embodiments of the transport refrigeration system may include: increasing, using a second DC/DC converter, the voltage of the electricity received from the energy storage device from the first voltage to a third voltage, wherein the second DC/DC converter is in a second circuit path and the first DC/DC converter is in a first circuit path; and converting, using a second DC/AC inverter, the electricity received from the second DC/DC converter from DC to AC and conveying the electricity to the second transportation refrigeration unit, wherein the second DC/AC inverter is the second circuit path and the first DC/AC inverter is in the first circuit path, and wherein the first DC/AC inverter is configured to convey the electricity to the first transportation refrigeration unit.

In addition to one or more of the features described above, or as an alternative, further embodiments of the transport refrigeration system may include: conveying the electricity from the energy storage device to the first DC/DC converter and the second DC/DC converter using a first electrical connection; and splitting, using a junction point, the electricity exiting the energy storage device into the first DC/DC converter and the second DC/DC converter.

In addition to one or more of the features described above, or as an alternative, further embodiments of the transport refrigeration system may include conveying the electricity from the first DC/AC inverter to the first transportation refrigeration unit using a second electrical connection; and conveying the electricity from the second DC/AC inverter to the second transportation refrigeration unit using a third electrical connection.

According to another embodiment, a method of assembling a multi-unit transport refrigeration system is provided. The method including: operably connecting a first transportation refrigeration unit to a first transport container, the first transportation refrigeration unit configured to refrigerate the first transport container; operably connecting a second transportation refrigeration unit to a second transport container, the second transportation refrigeration unit configured to refrigerate the second transport container; electrically connecting an energy storage device and a first DC/DC converter, the first DC/DC converter being configured to increase a voltage of the electricity received from the energy storage device from a first voltage to a second voltage; and electrically connecting the first DC/DC converter to the first transportation refrigeration unit and the second transportation refrigeration unit using at least a first DC/AC inverter, the first DC/AC inverter configured to convert electricity received from the energy storage device from DC to AC and then convey the electricity to at least one of the first transportation refrigeration unit or the second transportation refrigeration unit.

In addition to one or more of the features described above, or as an alternative, further embodiments of the transport refrigeration system may include: electrically connecting the energy storage device to the first DC/DC converter using a first electrical connection.

Technical effects of embodiments of the present disclosure include converting electricity stored in an energy storage device from direct current to alternating current and splitting the electricity to distribute to a first transportation refrigeration unit and a second transportation refrigeration unit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
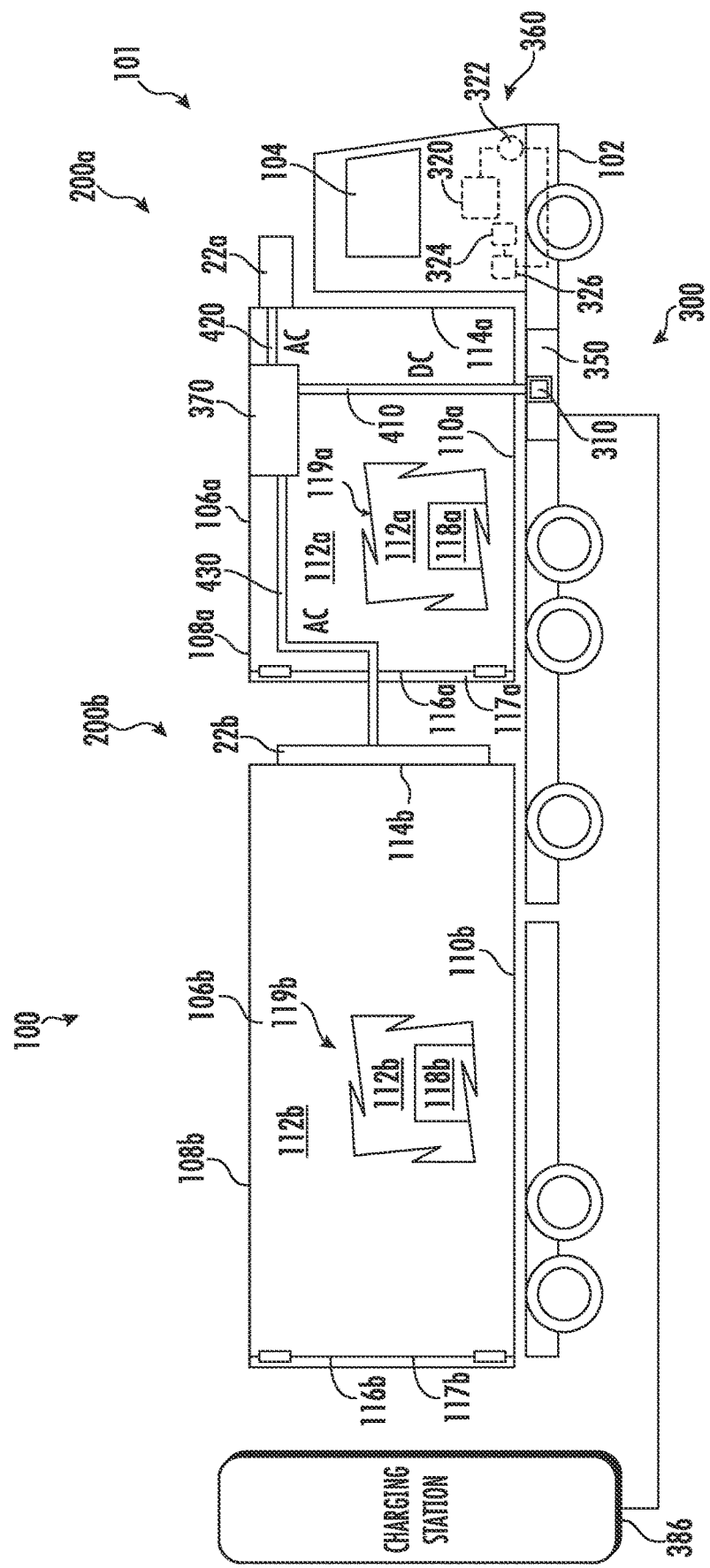
FIG. 1 is a schematic illustration of a multi-unit transport refrigeration system, according to an embodiment of the present disclosure.
Figure 2:
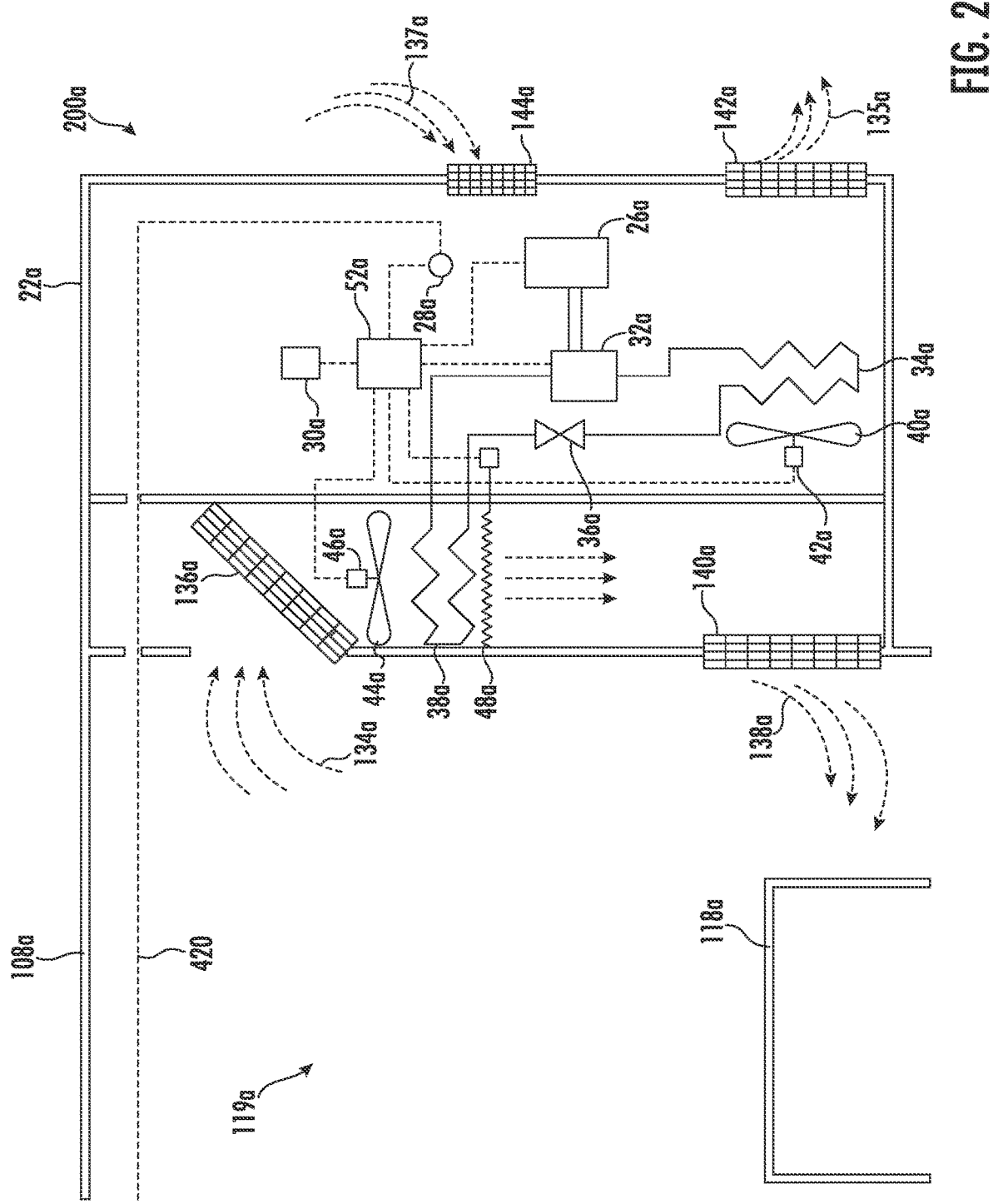
FIG. 2 is an enlarged schematic illustration of a first transportation refrigeration unit of the multi-unit transport refrigeration system of FIG. 1, according to an embodiment of the present disclosure.
Figure 3:
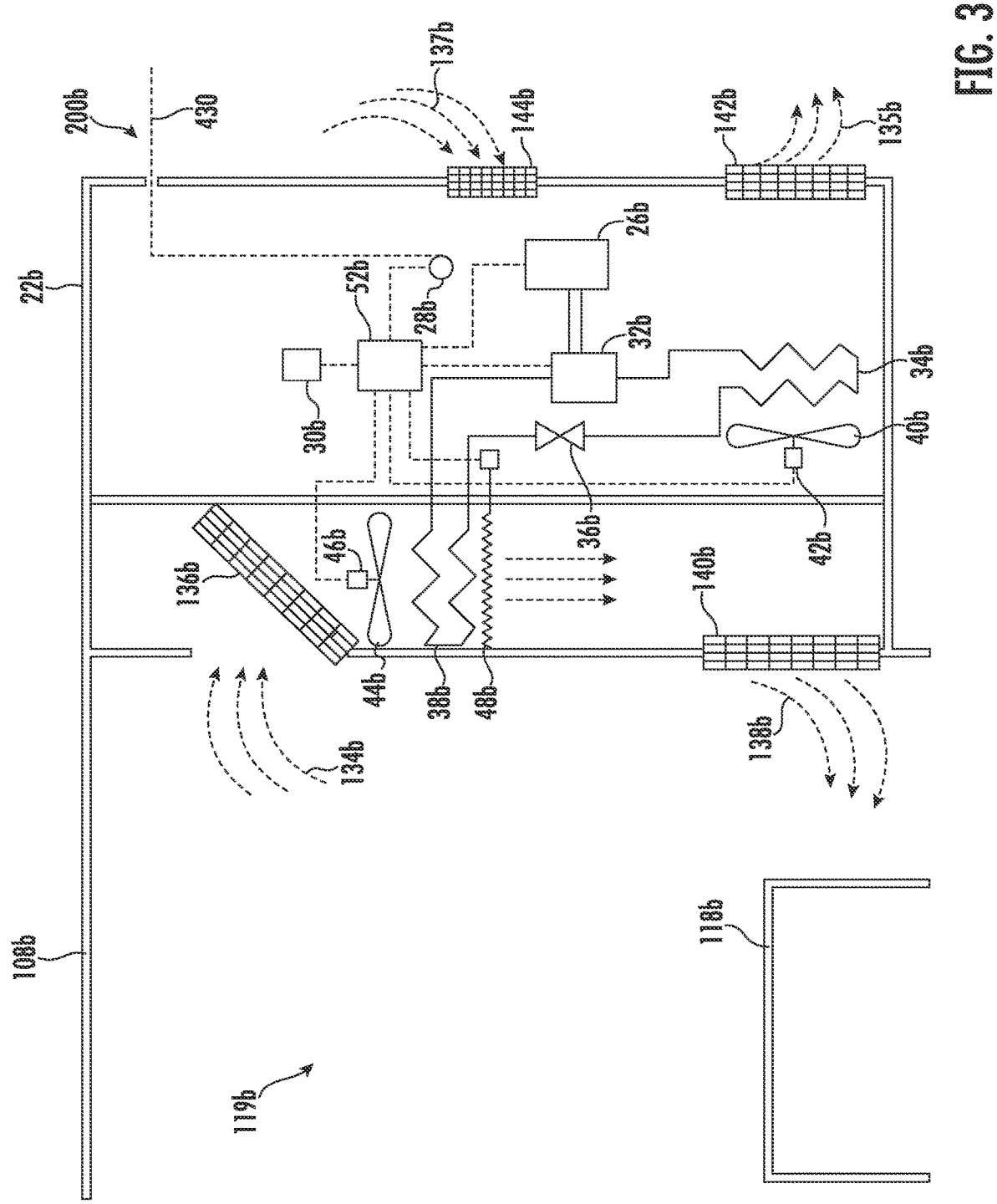
FIG. 3 is an enlarged schematic illustration of a second transportation refrigeration unit of the multi-unit transport refrigeration system of FIG. 1, according to an embodiment of the present disclosure.

Referring to FIGS. 1, 2, and 3, various embodiments of the present disclosure are illustrated. FIG. 1 shows a schematic illustration of a multi-unit transport refrigeration system 100, including a first transport refrigeration system 200a and a second transport refrigeration system 200b, according to an embodiment of the present disclosure. The multi-unit transport refrigeration system 100, may be incorporated into a truck or trailer system 101, as illustrated in FIG. 1. FIG. 2 shows an enlarged schematic illustration of the first transport refrigeration system 200a of FIG. 1, according to an embodiment of the present disclosure. FIG. 3 shows an enlarged schematic illustration of the second transport refrigeration system 200b of FIG. 1, according to an embodiment of the present disclosure.

The trailer system 101 includes a vehicle 102 integrally connected to a first transport container 106a and a second transport container 106b. The vehicle 102 includes an operator's compartment or cab 104 and a propulsion motor, which acts as the drive system of the truck or trailer system 101. The propulsion motor is configured to power the vehicle 102. The propulsion motor may be a combustion engine 320 that runs on a fuel, such as, compressed natural gas, liquefied natural gas, gasoline, diesel, or a combination thereof. The propulsion motor may be an electric motor 324 that runs on electricity from a truck energy storage device 326 (e.g., battery pack) and/or an energy storage device 350. The propulsion motor may also be a combination of the combustion engine 320 and the electric motor 324, such as, for example, a hybrid motor. It is understood that while both a combustion engine 320 and the electric motor 324 are illustrated in FIG. 1, the embodiments disclosed herein apply to a propulsion motor composed of the combustion engine 320 and/or the electric motor 324. The combustion engine 320 may be operably connected to a vehicle alternator 322 to generate electricity. The electricity generated by the vehicle alternator 322 may be utilized to charge the truck energy storage device 326.

Referring first to the first transport refrigeration system 200a, the first transport container 106a is coupled to the vehicle 102. The first transport container 106a may be removably coupled to the vehicle 102. The first transport container 106a is a refrigerated trailer and includes a top wall 108a, a directly opposed bottom wall 110a, opposed side walls 112a, and a front wall 114a, with the front wall 114a being closest to the vehicle 102. The first transport container 106a further includes a door or doors 117a at a rear wall 116a, opposite the front wall 114a. The walls of the first transport container 106a define a refrigerated cargo space 119a. The first refrigerated cargo space 119a may be subdivided into multiple different compartments that each have a different controlled environment (e.g., different temperature). It is appreciated by those of skill in the art that embodiments described herein may be applied to a tractor-trailer refrigerated system or non-trailer refrigeration such as, for example a rigid truck, a truck having refrigerated compartment.

Typically, the first transport refrigeration system 200a are used to transport and distribute perishable goods and environmentally sensitive goods (herein referred to as perishable goods 118a). The perishable goods 118a may include but are not limited to fruits, vegetables, grains, beans, nuts, eggs, dairy, seed, flowers, meat, poultry, fish, ice, blood, pharmaceuticals, or any other suitable cargo requiring temperature controlled transport. The first transport refrigeration system 200a includes a first transportation refrigeration unit 22a, a refrigerant compression device 32a, an electric motor 26a for driving the refrigerant compression device 32a, and a controller 30a. The first transportation refrigeration unit 22a is in operative association with the refrigerated cargo space 119a and is configured to provide conditioned air to the first transport container 106a. The first transportation refrigeration unit 22a functions, under the control of the controller 30a, to establish and regulate a desired environmental parameters, such as, for example temperature, pressure, humidity, carbon dioxide, ethylene, ozone, light exposure, vibration exposure, and other conditions in the first refrigerated cargo space 119a, as known to one of ordinary skill in the art. In an embodiment, the first transportation refrigeration unit 22a is capable of providing a desired temperature and humidity range.

The first transportation refrigeration unit 22a includes a refrigerant compression device 32a (e.g., compressor), a refrigerant heat rejection heat exchanger 34a (e.g., condenser), an expansion device 36a, and a refrigerant heat absorption heat exchanger 38a (e.g., evaporator) connected in refrigerant flow communication in a closed loop refrigerant circuit and arranged in a conventional refrigeration cycle. The first transportation refrigeration unit 22a also includes one or more fans 40a associated with the refrigerant heat rejection heat exchanger 34a and driven by fan motor(s) 42a and one or more fans 44a associated with the refrigerant heat absorption heat exchanger 38a and driven by fan motor(s) 46a. The first transportation refrigeration unit 22a may also include a heater 48a associated with the refrigerant heat absorption heat exchanger 38a. In an embodiment, the heater 48a may be an electric resistance heater. It is to be understood that other components (not shown) may be incorporated into the refrigerant circuit as desired, including for example, but not limited to, a suction modulation valve, a receiver, a filter/dryer, an economizer circuit. It is also to be understood that additional refrigeration circuits may be run in parallel and powered by an energy storage device 350 as desired.

The refrigerant heat rejection heat exchanger 34a may, for example, include one or more refrigerant conveying coiled tubes or one or more tube banks formed of a plurality of refrigerant conveying tubes across flow path to the heat outlet 142a. The fan(s) 40a are operative to pass air, typically ambient air, across the tubes of the refrigerant heat rejection heat exchanger 34a to cool refrigerant vapor passing through the tubes. The refrigerant heat rejection heat exchanger 34a may operate either as a refrigerant condenser, such as if the first transportation refrigeration unit 22a is operating in a subcritical refrigerant cycle or as a refrigerant gas cooler, such as if the first transportation refrigeration unit 22a is operating in a transcritical cycle.

The refrigerant heat absorption heat exchanger 38a may, for example, also include one or more refrigerant conveying coiled tubes or one or more tube banks formed of a plurality of refrigerant conveying tubes extending across flow path from a return air intake 136a. The fan(s) 44a are operative to pass air drawn from the refrigerated cargo space 119a across the tubes of the refrigerant heat absorption heat exchanger 38a to heat and evaporate refrigerant liquid passing through the tubes and cool the air. The air cooled in traversing the refrigerant heat absorption heat exchanger 38a is supplied back to the refrigerated cargo space 119a through a refrigeration unit outlet 140a. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

Airflow is circulated into and through the first refrigerated cargo space 119a of the first transport container 106a by means of the first transportation refrigeration unit 22a. A return airflow 134a flows into the first transportation refrigeration unit 22a from the refrigerated cargo space 119a through the return air intake 136a, and across the refrigerant heat absorption heat exchanger 38a via the fan 44a, thus conditioning the return airflow 134a to a selected or predetermined temperature. The conditioned return airflow 134a, now referred to as supply airflow 138a, is supplied into the first refrigerated cargo space 119a of the first transport container 106a through the refrigeration unit outlet 140a. Heat 135a is removed from the refrigerant heat rejection heat exchanger 34a through the heat outlet 142a. The first transportation refrigeration unit 22a may contain an external air inlet 144a, as shown in FIG. 2, to aid in the removal of heat 135a from the refrigerant heat rejection heat exchanger 34a by pulling in external air 137a. The supply airflow 138a may cool the perishable goods 118a in the first refrigerated cargo space 119a of the first transport container 106a. It is to be appreciated that the first transportation refrigeration unit 22a can further be operated in reverse to warm the first transport container 106a when, for example, the outside temperature is very low. In the illustrated embodiment, the return air intake 136a, the refrigeration unit outlet 140a, the heat outlet 142a, and the external air inlet 144a are configured as grilles to help prevent foreign objects from entering the first transportation refrigeration unit 22a.

The first transport refrigeration system 200a also includes a controller 30a configured for controlling the operation of the first transport refrigeration system 200a including, but not limited to, the operation of various components of the first transportation refrigeration unit 22a to provide and maintain a desired thermal environment within the first refrigerated cargo space 119a. The controller 30a may also be able to selectively operate the electric motor 26a. The controller 30a may be an electronic controller including a processor and an associated memory including computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

Referring next to the second transport refrigeration system 200b, the second transport container 106b is coupled to the vehicle 102. The second transport container 106b may be removably coupled to the vehicle 102. The second transport container 106b is a refrigerated trailer and includes a top wall 108b, a directly opposed bottom wall 110b, opposed side walls 112b, and a front wall 114b, with the front wall 114b being closest to the vehicle 102. The second transport container 106b further includes a door or doors 117b at a rear wall 116b, opposite the front wall 114b. The walls of the second transport container 106b define a refrigerated cargo space 119b. The second refrigerated cargo space 119b may be subdivided into multiple different compartments that each have a different controlled environment (e.g., different temperature). It is appreciated by those of skill in the art that embodiments described herein may be applied to a tractor-trailer refrigerated system or non-trailer refrigeration such as, for example a rigid truck, a truck having refrigerated compartment.

Typically, the second transport refrigeration system 200b are used to transport and distribute perishable goods and environmentally sensitive goods (herein referred to as perishable goods 118a). The perishable goods 118b may include but are not limited to fruits, vegetables, grains, beans, nuts, eggs, dairy, seed, flowers, meat, poultry, fish, ice, blood, pharmaceuticals, or any other suitable cargo requiring temperature controlled transport. The second transport refrigeration system 200b includes a second transportation refrigeration unit 22b, a refrigerant compression device 32b, an electric motor 26b for driving the refrigerant compression device 32b, and a controller 30b. The second transportation refrigeration unit 22b is in operative association with the refrigerated cargo space 119b and is configured to provide conditioned air to the second transport container 106b. The second transportation refrigeration unit 22b functions, under the control of the controller 30b, to establish and regulate a desired environmental parameters, such as, for example temperature, pressure, humidity, carbon dioxide, ethylene, ozone, light exposure, vibration exposure, and other conditions in the second refrigerated cargo space 119b, as known to one of ordinary skill in the art. In an embodiment, the second transportation refrigeration unit 22b is capable of providing a desired temperature and humidity range.

The second transportation refrigeration unit 22b includes a refrigerant compression device 32b (e.g., compressor), a refrigerant heat rejection heat exchanger 34b (e.g., condenser), an expansion device 36b, and a refrigerant heat absorption heat exchanger 38b (e.g., evaporator) connected in refrigerant flow communication in a closed loop refrigerant circuit and arranged in a conventional refrigeration cycle. The second transportation refrigeration unit 22b also includes one or more fans 40b associated with the refrigerant heat rejection heat exchanger 34b and driven by fan motor(s) 42b and one or more fans 44b associated with the refrigerant heat absorption heat exchanger 38b and driven by fan motor(s) 46b. The second transportation refrigeration unit 22b may also include a heater 48b associated with the refrigerant heat absorption heat exchanger 38b. In an embodiment, the heater 48b may be an electric resistance heater. It is to be understood that other components (not shown) may be incorporated into the refrigerant circuit as desired, including for example, but not limited to, a suction modulation valve, a receiver, a filter/dryer, an economizer circuit. It is also to be understood that additional refrigeration circuits may be run in parallel and powered by an energy storage device 350 as desired.

The refrigerant heat rejection heat exchanger 34b may, for example, include one or more refrigerant conveying coiled tubes or one or more tube banks formed of a plurality of refrigerant conveying tubes across flow path to the heat outlet 142b. The fan(s) 40b are operative to pass air, typically ambient air, across the tubes of the refrigerant heat rejection heat exchanger 34b to cool refrigerant vapor passing through the tubes. The refrigerant heat rejection heat exchanger 34b may operate either as a refrigerant condenser, such as if the second transportation refrigeration unit 22b is operating in a subcritical refrigerant cycle or as a refrigerant gas cooler, such as if the second transportation refrigeration unit 22b is operating in a transcritical cycle.

The refrigerant heat absorption heat exchanger 38b may, for example, also include one or more refrigerant conveying coiled tubes or one or more tube banks formed of a plurality of refrigerant conveying tubes extending across flow path from a return air intake 136b. The fan(s) 44b are operative to pass air drawn from the refrigerated cargo space 119b across the tubes of the refrigerant heat absorption heat exchanger 38b to heat and evaporate refrigerant liquid passing through the tubes and cool the air. The air cooled in traversing the refrigerant heat absorption heat exchanger 38b is supplied back to the refrigerated cargo space 119b through a refrigeration unit outlet 140b. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

Airflow is circulated into and through the second refrigerated cargo space 119b of the second transport container 106b by means of the second transportation refrigeration unit 22b. a return airflow 134b flows into the second transportation refrigeration unit 22b from the refrigerated cargo space 119b through the return air intake 136b, and across the refrigerant heat absorption heat exchanger 38b via the fan 44b, thus conditioning the return airflow 134b to a selected or predetermined temperature. The conditioned return airflow 134b, now referred to as supply airflow 138b, is supplied into the second refrigerated cargo space 119b of the second transport container 106b through the refrigeration unit outlet 140b. Heat 135b is removed from the refrigerant heat rejection heat exchanger 34b through the heat outlet 142b. The second transportation refrigeration unit 22b may contain an external air inlet 144b, as shown in FIG. 2, to aid in the removal of heat 135b from the refrigerant heat rejection heat exchanger 34b by pulling in external air 137b. The supply airflow 138b may cool the perishable goods 118b in the second refrigerated cargo space 119b of the second transport container 106b. It is to be appreciated that the second transportation refrigeration unit 22b can further be operated in reverse to warm the second transport container 106b when, for example, the outside temperature is very low. In the illustrated embodiment, the return air intake 136b, the refrigeration unit outlet 140b, the heat outlet 142b, and the external air inlet 144b are configured as grilles to help prevent foreign objects from entering the second transportation refrigeration unit 22b.

The second transport refrigeration system 200b also includes a controller 30b configured for controlling the operation of the second transport refrigeration system 200b including, but not limited to, the operation of various components of the second transportation refrigeration unit 22b to provide and maintain a desired thermal environment within the second refrigerated cargo space 119b. The controller 30b may also be able to selectively operate the electric motor 26b. The controller 30b may be an electronic controller including a processor and an associated memory including computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The first transportation refrigeration unit 22a and the second transportation refrigeration unit 22b are powered by the energy management system 300 or more specifically the energy storage device 350, which provides electricity to the first transportation refrigeration unit 22a and the second transportation refrigeration unit 22b. The energy management system 300 may include the energy storage device 350, a power conversion system 370, and a power management system 310. Examples of the energy storage device 350 may include a battery system (e.g., a battery, a battery pack, or bank of batteries), fuel cells, flow battery, and others devices capable of storing and outputting electricity that may be direct current (DC). The energy storage device 350 may include a battery system, which may employ multiple batteries organized into battery banks. In one embodiment, the energy storage device 350 may provide electricity to the first transportation refrigeration unit 22a and the second transportation refrigeration unit 22b. The energy storage device 350 may be located with the vehicle 102.

The energy storage device 350 may be charged by a stationary charging station 386 such as, for example a wall 48V power outlet. The charging station 386 may provide single phase (e.g., level 2 charging capability) or three phase alternating current (AC) energy to the energy storage device 350. It is understood that the charging station 386 may have any phase charging and embodiments disclosed herein are not limited to single phase or three phase AC power. In an embodiment, the single phase AC power may be a high voltage DC power, such as, for example, between 48 to 900 VDC.

The first transportation refrigeration unit 22a has a plurality of electrical power demand loads on the energy storage device 350, including, but not limited to, the electric motor 26a for the refrigerant compression device 32a, the fan motor 42a for the fan 40a associated with the refrigerant heat rejection heat exchanger 34a, and the fan motor 46a for the fan 44a associated with the refrigerant heat absorption heat exchanger 38a. In the depicted embodiment, the heater 48a also constitutes an electrical power demand load. The electric resistance heater 48a may be selectively operated by the controller 30a whenever a control temperature within the temperature controlled cargo box drops below a preset lower temperature limit, which may occur in a cold ambient environment. In such an event the controller 30a would activate the heater 48a to heat air circulated over the heater 48a by the fan(s) 44a associated with the refrigerant heat absorption heat exchanger 38a. The heater 48a may also be used to de-ice the return air intake 136a. The refrigerant compression device 32a may include a single-stage or multiple-stage compressor such as, for example, a reciprocating compressor or a scroll compressor. The first transport refrigeration system 200a may also include a voltage sensor 28a to sense the incoming voltage.

Likewise, the second transportation refrigeration unit 22b has a plurality of electrical power demand loads on the energy storage device 350, including, but not limited to, the electric motor 26b for the refrigerant compression device 32b, the fan motor 42b for the fan 40b associated with the refrigerant heat rejection heat exchanger 34b, and the fan motor 46b for the fan 44b associated with the refrigerant heat absorption heat exchanger 38b. In the depicted embodiment, the heater 48b also constitutes an electrical power demand load. The electric resistance heater 48b may be selectively operated by the controller 30b whenever a control temperature within the temperature controlled cargo box drops below a preset lower temperature limit, which may occur in a cold ambient environment. In such an event the controller 30b would activate the heater 48b to heat air circulated over the heater 48b by the fan(s) 44b associated with the refrigerant heat absorption heat exchanger 38b. The heater 48b may also be used to de-ice the return air intake 136b. The refrigerant compression device 32b may include a single-stage or multiple-stage compressor such as, for example, a reciprocating compressor or a scroll compressor. The second transport refrigeration system 200b may also include a voltage sensor 28b to sense the incoming voltage.

The power management system 310 may be configured to control and/or adjust the energy output of the energy storage device 350 in response to transportation refrigeration unit parameters of the first transportation refrigeration unit 22a and the second transportation refrigeration unit 22b. The transportation refrigeration unit parameters may include but are not limited to set point, ambient temperature, delta T° between the temperature in the refrigerated cargo spaces 119a, 119b and the temperature set point of the transportation refrigeration unit 22a, 22b, airflow rate into or out of the transport container 106a, 106b, cooling capacity, temperature homogeneity in the transport container 106a, 106b, doors 117a, 117b opening situation . . . etc. Transportation refrigeration unit parameters, such as delta T° may be important because a high delta T° may indicate that an increase energy is required for pull down or pull up. The power management system 310 is in electrical communication with the energy storage device 350 and the power conversion system 370. The power conversion system 370 electrically connects the energy storage device 350 to the first transportation refrigeration unit 22a and the second transportation refrigeration unit 22b. The power management system 310 may also be in electrical communication with the energy storage device 350. The power management system 310 may be configured to control and/or adjust energy output of the power conversion system 370 in response to parameters of the energy storage device 350, including, but not limited to, a state of charge of the energy storage device 350 a state of health of the energy storage device 350, and a temperature of the energy storage device 350.

It should be appreciated that, although particular components of the energy management system 300 are separately defined in the schematic block diagram of FIG. 1, each or any of the components may be otherwise combined or separated via hardware and/or software. In one example, while the power management system 310 is illustrated in FIG. 1 as being separate from the transportation refrigeration unit 22a, 22b, in various embodiments, the power management system 310 may be incorporated into the transportation refrigeration unit 22a, 22b and/or the controller 30a, 30b of the transportation refrigeration unit 22a, 22b. In an embodiment, the power management system 310 may be a computer program product (e.g., software) encoded within controller 30a, 30b. In another example, while the power conversion system 370 is illustrated in FIG. 1 as being separate from the energy storage device 350 and the transportation refrigeration unit 22a, 22b, in various embodiments, the power conversion system 370 may be incorporated in the energy storage device 350 or the transportation refrigeration unit 22a, 22b. In one embodiment, the power conversion system 370 is incorporated in the energy storage device 350. In another embodiment, the power conversion system 370 is separate from the energy storage device 350 (i.e., not incorporated in the energy storage device 350).

The power management system 310 may be an electronic controller including a processor and an associated memory including computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The power conversion system 370 is electrically connected to the energy storage device 350 via a first electrical connection 410. The first electrical connection 410 may be an electrical wire configured to convey DC. The first transportation refrigeration unit 22a is electrically connected to the power conversion system 370 via a second electrical connection 420. The second electrical connection 420 may be an electrical wire configured to convey AC. The second transportation refrigeration unit 22b is electrically connected to the power conversion system 370 via a third electrical connection 430. The third electrical connection 430 may be an electrical wire configured to convey AC. It will be appreciated that the multi-unit transport refrigeration system 100 described herein may incorporate any one of the electrical architectures 400, 500, 600, 700, 800 shown in FIGS. 4-8, each of which include at least a first DC/AC inverter 374 (and multiple of which further include a first DC/DC converter 372).

Figure 4:
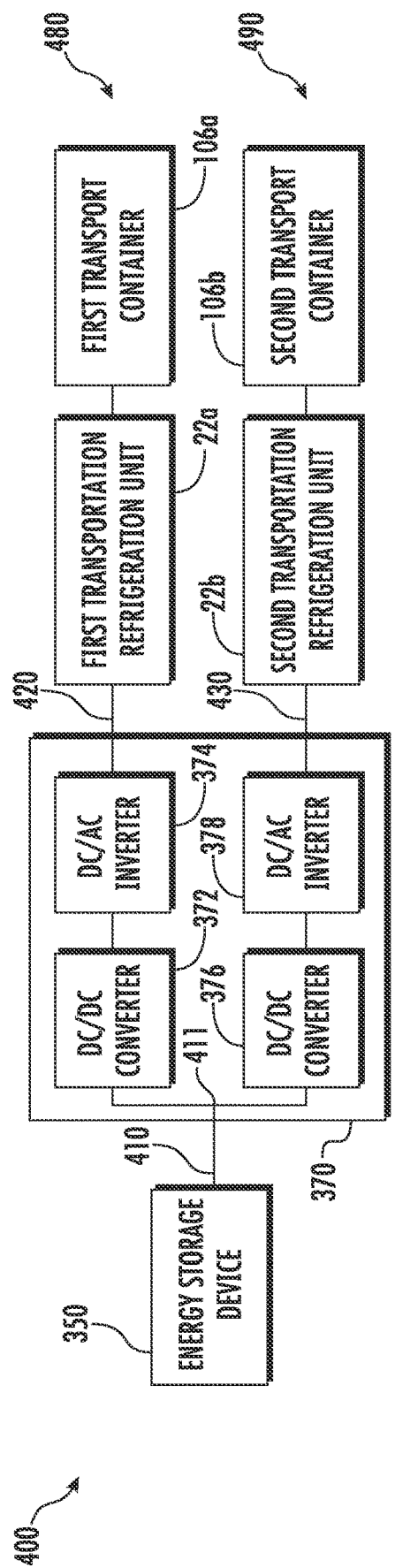
FIG. 4 is an enlarged schematic illustration of a first electrical architecture for the multi-unit transport refrigeration system of FIG. 1, according to an embodiment of the present disclosure.

Referring now to FIG. 4, a first electrical architecture 400 for the multi-unit transport refrigeration system 100 of FIG. 1 is illustrated, according to an embodiment of the present disclosure. The first electrical architecture 400 is configured to distribute electricity from the energy storage device 350 to a first transportation refrigeration unit 22a and a second transportation refrigeration unit 22b. The electricity from the energy storage device 350 powers the first transportation refrigeration unit 22a, which is configured to refrigerate the first transport container 106a. The electricity from the energy storage device 350 powers the second transportation refrigeration unit 22b, which is configured to refrigerate the second transport container 106b.

As illustrated in FIG. 4, the energy storage device 350 is electrically connected to the power conversion system 370. The power conversion system 370 includes a first DC/DC converter 372, a first DC/AC inverter 374, a second DC/DC converter 376, and a second DC/AC inverter 378. The first DC/DC converter 372 is in series with the first DC/AC inverter 374. The second DC/DC converter 376 is in series with the second DC/AC inverter 378. The first DC/DC converter 372 and the first DC/AC inverter 374 are in a first circuit path 480 and the second DC/DC converter 376 and the second DC/AC inverter 378 are in a second circuit path 490. The first DC/DC converter 372 and the second DC/DC converter 376 are electrically connected to the energy storage device 350 through the first electrical connection 410. Electricity received with the energy storage device 350 to the power conversion system 370 is split between the first DC/DC converter 372 and the second DC/DC converter 376. Electricity entering the power conversion system 370 is split at a junction point 411 into the first DC/DC converter 372 and the second DC/DC converter 376. Electricity exiting the energy storage device 350 is split at a junction point 411 into the first DC/DC converter 372 and the second DC/DC converter 376. The first DC/DC converter 372 and the second DC/DC converter 376 are configured to increase or boost the voltage of the electricity received from the energy storage device 350.

The first DC/DC converter 372 is configured to increase the voltage received from the energy storage device 350 from a first voltage to a second voltage and then deliver the electricity at the second voltage to the first DC/AC inverter 374. The second voltage is greater than the first voltage. The first DC/AC inverter 374 is electrically connected to the first DC/DC converter 372. The first DC/AC inverter 374 is configured to convert the electricity received from the first DC/DC converter 372 from DC to AC and then convey the electricity to the first transportation refrigeration unit 22a. The first DC/AC inverter 374 is electrically connected to the first transportation refrigeration unit 22a via the second electrical connection 420.

The second DC/DC converter 376 is configured to increase the voltage received from the energy storage device 350 from a first voltage to a third voltage and then deliver the electricity at the third voltage to the second DC/AC inverter 378. The third voltage is greater than the first voltage. The third voltage may also be equivalent to the second voltage. The second DC/AC inverter 378 is electrically connected to the second DC/DC converter 376. The second DC/AC inverter 378 is configured to convert the electricity received from the second DC/DC converter 376 from DC to AC and then convey the electricity to the second transportation refrigeration unit 22b. The second DC/AC inverter 378 is electrically connected to the second transportation refrigeration unit 22b via the third electrical connection 430.

Figure 5:
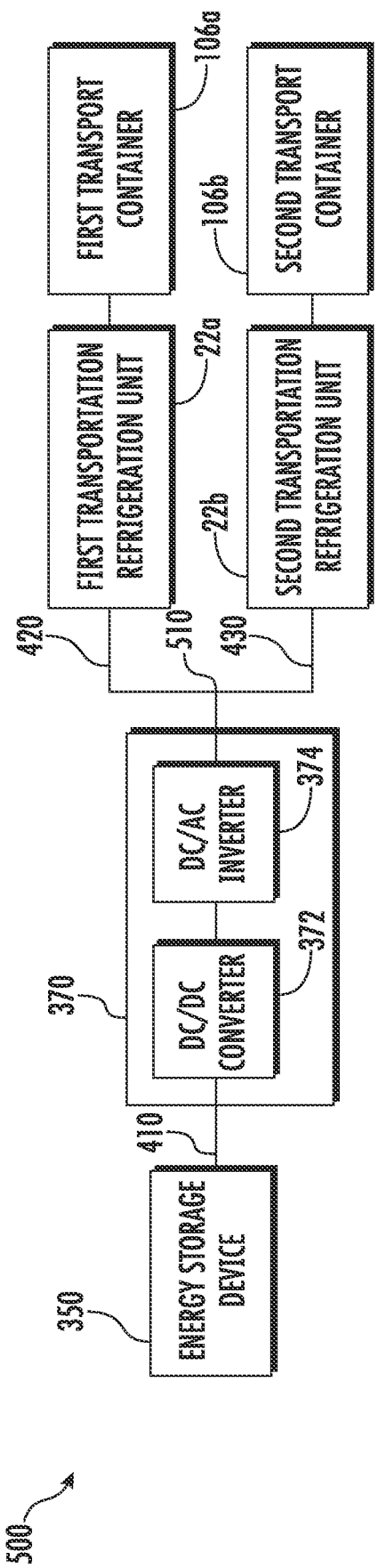
FIG. 5 is an enlarged schematic illustration of a second electrical architecture for the multi-unit transport refrigeration system of FIG. 1, according to an embodiment of the present disclosure.

Referring now to FIG. 5, a second electrical architecture 500 for the multi-unit transport refrigeration system 100 of FIG. 1 is illustrated, according to an embodiment of the present disclosure. The second electrical architecture 500 is configured to distribute electricity from the energy storage device 350 to a first transportation refrigeration unit 22a and a second transportation refrigeration unit 22b. The electricity from the energy storage device 350 powers the first transportation refrigeration unit 22a, which is configured to refrigerate the first transport container 106a. The electricity from the energy storage device 350 powers the second transportation refrigeration unit 22b, which is configured to refrigerate the second transport container 106b.

As illustrated in FIG. 5, the energy storage device 350 is electrically connected to the power conversion system 370. The power conversion system 370 includes a first DC/DC converter 372 and a first DC/AC inverter 374. The first DC/DC converter 372 is in series with the first DC/AC inverter 374. The first DC/DC converter 372 is electrically connected to the energy storage device 350 through the first electrical connection 410. Electricity received with the energy storage device 350 to the power conversion system 370 is delivered to the first DC/DC converter 372. The first DC/DC converter 372 is configured to increase or boost the voltage of the electricity received from the energy storage device 350.

The first DC/DC converter 372 is configured to increase the voltage received from the energy storage device 350 from a first voltage to a second voltage and then deliver the electricity at the second voltage to the first DC/AC inverter 374. The second voltage is greater than the first voltage. The first DC/AC inverter 374 is electrically connected to the first DC/DC converter 372. The first DC/AC inverter 374 is configured to convert the electricity received from the first DC/DC converter 372 from DC to AC and then convey the electricity to the first transportation refrigeration unit 22*a* and the second transportation refrigeration unit 22*b*. The first DC/AC inverter 374 is electrically connected to the first transportation refrigeration unit 22*a* via the second electrical connection 420. The first DC/AC inverter 374 is electrically connected to the second transportation refrigeration unit 22*b* via the third electrical connection 430. Electricity exiting the first DC/AC inverter 374 may be split at a junction point 510 into the second electrical connection 420 and the third electrical connection 430.

Figure 6:
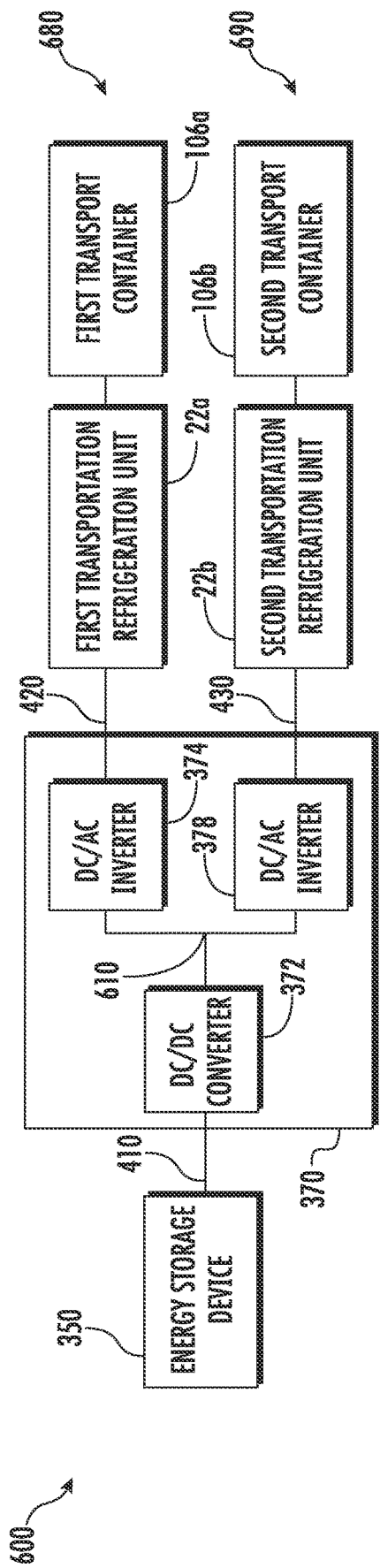
FIG. 6 is an enlarged schematic illustration of a third electrical architecture for the multi-unit transport refrigeration system of FIG. 1, according to an embodiment of the present disclosure.

Referring now to FIG. 6, a third electrical architecture 600 for the multi-unit transport refrigeration system 100 of FIG. 1 is illustrated, according to an embodiment of the present disclosure. The third electrical architecture 600 is configured to distribute electricity from the energy storage device 350 to a first transportation refrigeration unit 22*a* and a second transportation refrigeration unit 22*b*. The electricity from the energy storage device 350 powers the first transportation refrigeration unit 22*a*, which is configured to refrigerate the first transport container 106*a*. The electricity from the energy storage device 350 powers the second transportation refrigeration unit 22*b*, which is configured to refrigerate the second transport container 106*b*.

As illustrated in FIG. 6, the energy storage device 350 is electrically connected to the power conversion system 370. The power conversion system 370 includes a first DC/DC converter 372, a first DC/AC inverter 374, and a second DC/AC inverter 378. The first DC/DC converter 372 is in series with the first DC/AC inverter 374 and the second DC/AC inverter 378. The first DC/AC inverter 374 is in a first circuit path 680 and the second DC/AC inverter 378 is in a second circuit path 690. The first DC/DC converter 372 is electrically connected to the energy storage device 350 through the first electrical connection 410. Electricity received with the energy storage device 350 to the power conversion system 370 is conveyed to the first DC/DC converter 372.

Electricity exiting the first DC/DC converter 372 is split at a junction point 610 into the first DC/AC inverter 374 and the second DC/AC inverter 378. The first DC/DC converter 372 is configured to increase or boost the voltage of the electricity received from the energy storage device 350.

The first DC/DC converter 372 is configured to increase the voltage received from the energy storage device 350 from a first voltage to a second voltage and then deliver the electricity at the second voltage to the first DC/AC inverter 374 and the second DC/AC inverter 378. The second voltage is greater than the first voltage. The first DC/AC inverter 374 is electrically connected to the first DC/DC converter 372. The first DC/AC inverter 374 is configured to convert the electricity received from the first DC/DC converter 372 from DC to AC and then convey the electricity to the first transportation refrigeration unit 22*a*. The first DC/AC inverter 374 is electrically connected to the first transportation refrigeration unit 22*a* via the second electrical connection 420.

The second DC/AC inverter 378 is electrically connected to the first DC/DC converter 372. The second DC/AC inverter 378 is configured to convert the electricity received from the first DC/DC converter 372 from DC to AC and then convey the electricity to the second transportation refrigeration unit 22*b*. The second DC/AC inverter 378 is electrically connected to the second transportation refrigeration unit 22*b* via the third electrical connection 430.

Figure 7:
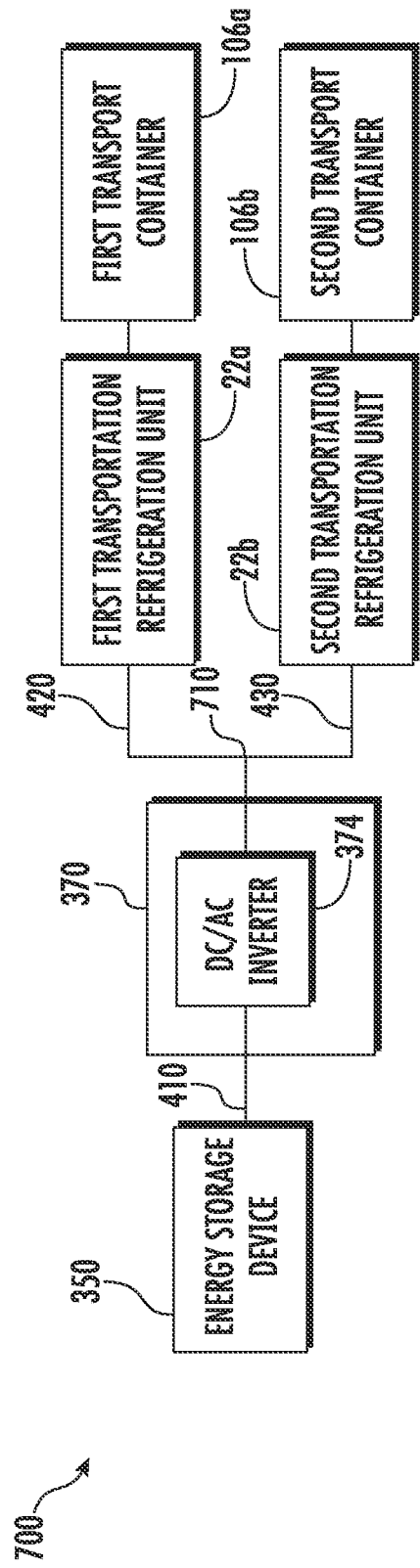
FIG. 7 is an enlarged schematic illustration of a fourth electrical architecture for the multi-unit transport refrigeration system of FIG. 1, according to an embodiment of the present disclosure.

Referring now to FIG. 7, a fourth electrical architecture 700 for the multi-unit transport refrigeration system 100 of FIG. 1 is illustrated, according to an embodiment of the present disclosure. The fourth electrical architecture 700 is configured to distribute electricity from the energy storage device 350 to a first transportation refrigeration unit 22*a* and a second transportation refrigeration unit 22*b*. The electricity from the energy storage device 350 powers the first transportation refrigeration unit 22*a*, which is configured to refrigerate the first transport container 106*a*. The electricity from the energy storage device 350 powers the second transportation refrigeration unit 22*b*, which is configured to refrigerate the second transport container 106*b*.

As illustrated in FIG. 7, the energy storage device 350 is electrically connected to the power conversion system 370. The power conversion system 370 includes a first DC/AC inverter 374. The first DC/AC inverter 374 is electrically connected to the energy storage device 350 through the first electrical connection 410. Electricity received with the energy storage device 350 to the power conversion system 370 is delivered the first DC/AC inverter 374.

The first DC/AC inverter 374 is configured to convert the electricity received from the energy storage device 350 from DC to AC and then convey the electricity to the first transportation refrigeration unit 22*a* and the second transportation refrigeration unit 22*b*. The first DC/AC inverter 374 is electrically connected to the first transportation refrigeration unit 22*a* via the second electrical connection 420. The first DC/AC inverter 374 is electrically connected to the second transportation refrigeration unit 22*b* via the third electrical connection 430. Electricity exiting the first DC/AC inverter 374 may be split at a junction point 710 into the second electrical connection 420 and the third electrical connection 430.

Figure 8:
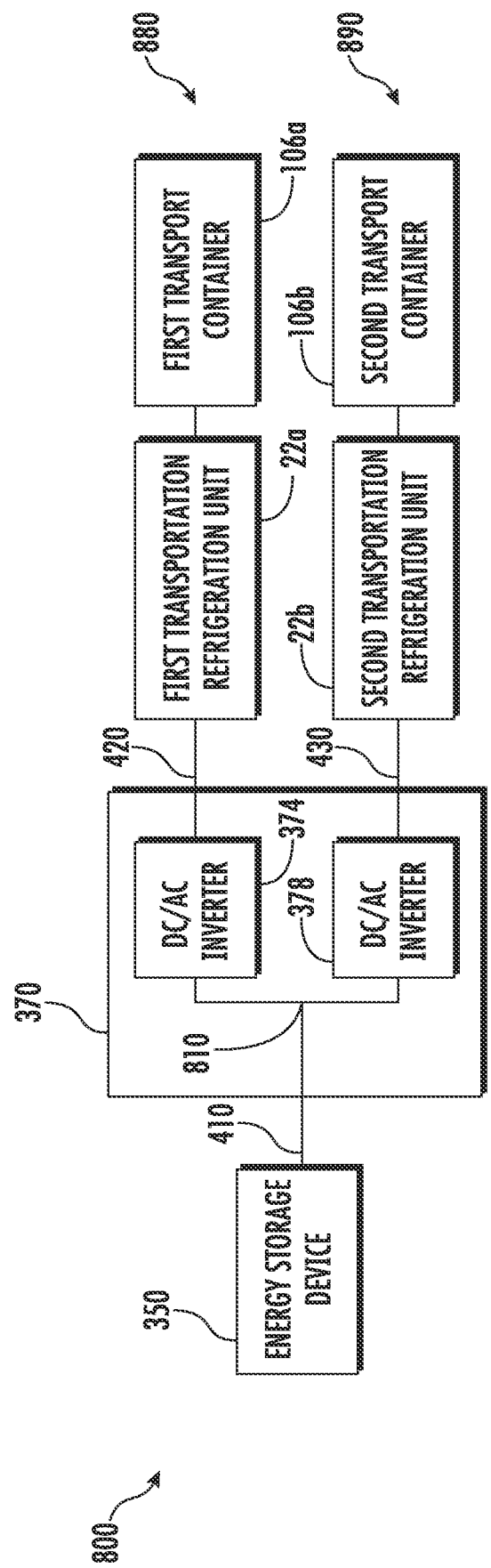
FIG. 8 is an enlarged schematic illustration of a fifth electrical architecture for the multi-unit transport refrigeration system of FIG. 1, according to an embodiment of the present disclosure.

Referring now to FIG. 8, a fifth electrical architecture 800 for the multi-unit transport refrigeration system 100 of FIG. 1 is illustrated, according to an embodiment of the present disclosure. The fifth electrical architecture 800 is configured to distribute electricity from the energy storage device 350 to a first transportation refrigeration unit 22*a* and a second transportation refrigeration unit 22*b*. The electricity from the energy storage device 350 powers the first transportation refrigeration unit 22*a*, which is configured to refrigerate the first transport container 106*a*. The electricity from the energy storage device 350 powers the second transportation refrigeration unit 22*b*, which is configured to refrigerate the second transport container 106*b*.

As illustrated in FIG. 8, the energy storage device 350 is electrically connected to the power conversion system 370. The power conversion system 370 includes a first DC/AC inverter 374 and a second DC/AC inverter 378. The first DC/AC inverter 374 is in a first circuit path 880 and the second DC/AC inverter 378 is in a second circuit path 890. The first DC/AC inverter 374 and the second DC/AC inverter 378 are electrically connected to the energy storage device 350 through the first electrical connection 410. Electricity received with the energy storage device 350 to the power conversion system 370 is conveyed to the first DC/AC inverter 374 and the second DC/AC inverter 378. Electricity exiting the energy storage device 350 is split at a junction point 810 into the first DC/AC inverter 374 and the second DC/AC inverter 378.

The first DC/AC inverter 374 is configured to convert the electricity received from the energy storage device 350 from DC to AC and then convey the electricity to the first transportation refrigeration unit 22*a*. The first DC/AC inverter 374 is electrically connected to the first transportation refrigeration unit 22*a* via the second electrical connection 420.

The second DC/AC inverter 378 is electrically connected to the energy storage device 350. The second DC/AC inverter 378 is configured to convert the electricity received from the energy storage device 350 from DC to AC and then convey the electricity to the second transportation refrigeration unit 22b. The second DC/AC inverter 378 is electrically connected to the second transportation refrigeration unit 22b via the third electrical connection 430.

Figure 9:
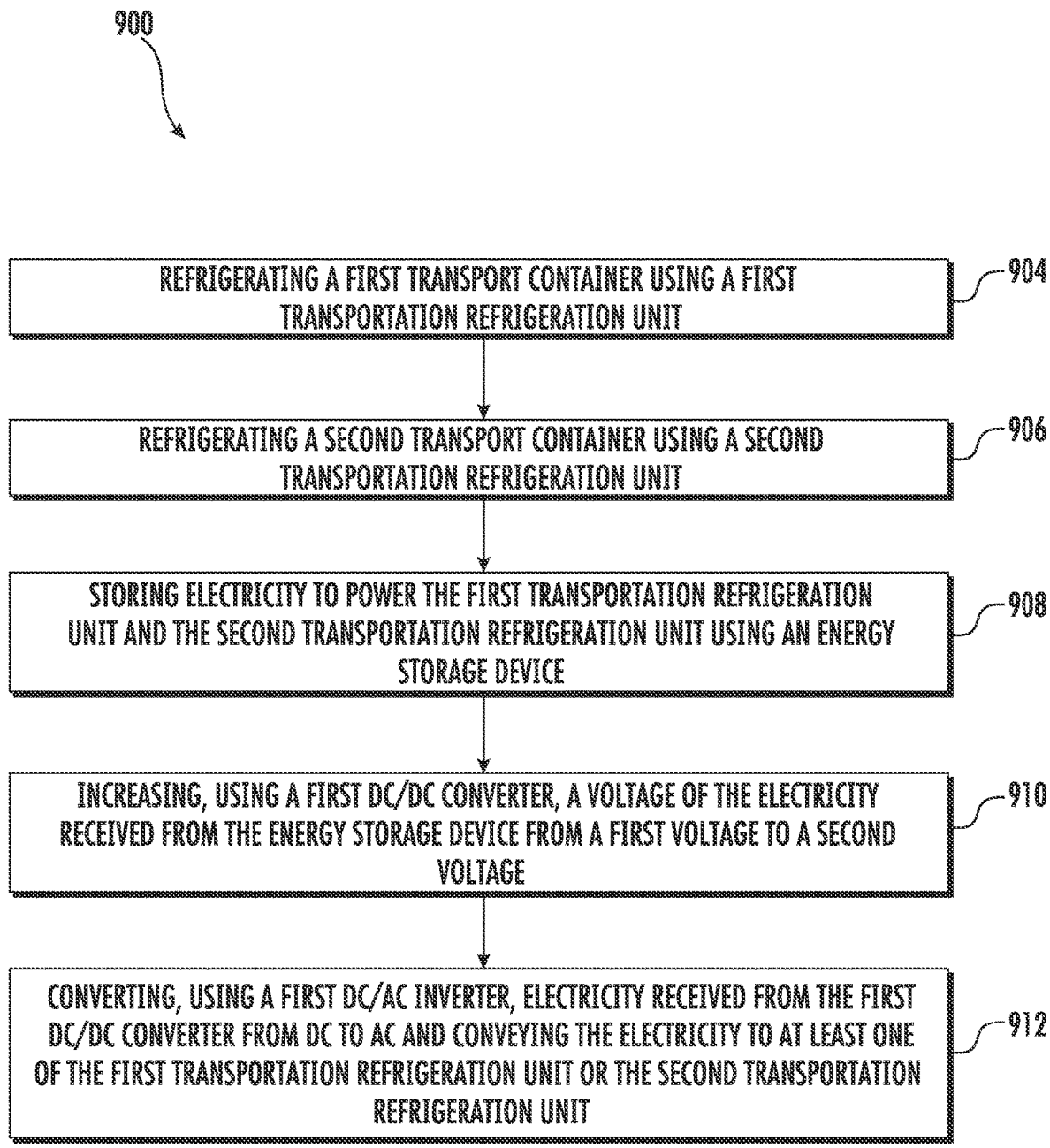
FIG. 9 is a flow process illustrating a method of operating the multi-unit transport refrigeration system of FIG. 1, according to an embodiment of the present disclosure.

Referring now to FIG. 9, with continued reference to FIGS. 4-6. FIG. 9 shows a flow process illustrating a method 900 of operating a multi-unit transport refrigeration system 100, according to an embodiment of the present disclosure.

At block 904, a first transportation refrigeration unit 22a refrigerates a first transport container 106a. At block 906, a second transportation refrigeration unit 22b refrigerates a second transport container 106b. At block 908, electricity to power the first transportation refrigeration unit 22a and the second transportation refrigeration unit 22b is stored using an energy storage device 350. At block 910, first DC/DC converter 372 increases a voltage of the electricity received from the energy storage device 350 from a first voltage to a second voltage. At block 912, a first DC/AC inverter 374 converts the electricity received from the first DC/DC converter 372 from DC to AC and conveys the electricity to at least one of the first transportation refrigeration unit 22a or the second transportation refrigeration unit 22b.

The method 900 may further provide that the electricity is conveyed from the energy storage device 350 to the first DC/DC converter 372 using a first electrical connection 410, from the first DC/AC inverter 374 to the first transportation refrigeration unit 22a using a second electrical connection 420, and from the first DC/AC inverter 374 to the second transportation refrigeration unit 22b using a third electrical connection 430. The electricity may be split exiting the first DC/AC inverter 374 into the second electrical connection 420 and third electrical connection 430 using a junction point 510.

The method 900 may also provide that a second DC/AC inverter 378 converts the electricity received from the first DC/DC converter 372 from DC to AC and conveys the electricity to the second transportation refrigeration unit 22b. The second DC/AC inverter 378 is in a second circuit path 490, 690 and the first DC/AC inverter 374 is in a first circuit path 480, 680. The first DC/AC inverter 374 is configured to convey the electricity to the first transportation refrigeration unit 22a.

The method 900 may yet further provide that the electricity is conveyed from the energy storage device 350 to the first DC/DC converter 372 using a first electrical connection 410. The electricity is split exiting the first DC/DC converter 372 into the first DC/AC inverter 374 and the second DC/AC inverter 378 using a junction point 610.

The method 900 may also further provide that the electricity is conveyed from the first DC/AC inverter 374 to the first transportation refrigeration unit 22a using a second electrical connection 420 and from the second DC/AC inverter 378 to the second transportation refrigeration unit 22b using a third electrical connection 430.

The method 900 may additionally provide that a second DC/DC converter 376 increases the voltage of the electricity received from the energy storage device 350 from the first voltage to a third voltage. The third voltage may be equivalent to the second voltage. The second DC/DC converter 376 is a second circuit path 490 and the first DC/DC converter 372 is in a first circuit path 480. A second DC/AC inverter 378 converts the electricity received from the second DC/DC converter 376 from DC to AC and conveying the electricity to the second transportation refrigeration unit 106b. The second DC/AC inverter 376 is in the second circuit path 490 and the first DC/AC inverter 374 is in the first circuit path 480. The first DC/AC inverter 374 is configured to convey the electricity to the first transportation refrigeration unit 106a. The electricity is conveyed from the energy storage device 350 to the first DC/DC converter 372 and the second DC/DC converter 376 using a first electrical connection 410. A junction point 411 is configured to split the electricity exiting the energy storage device 350 into the first DC/DC converter 372 and the second DC/DC converter 376.

While the above description has described the flow process of FIG. 9 in a particular order, it should be appreciated that unless otherwise specifically required in the attached claims that the ordering of the steps may be varied.

Figure 10:
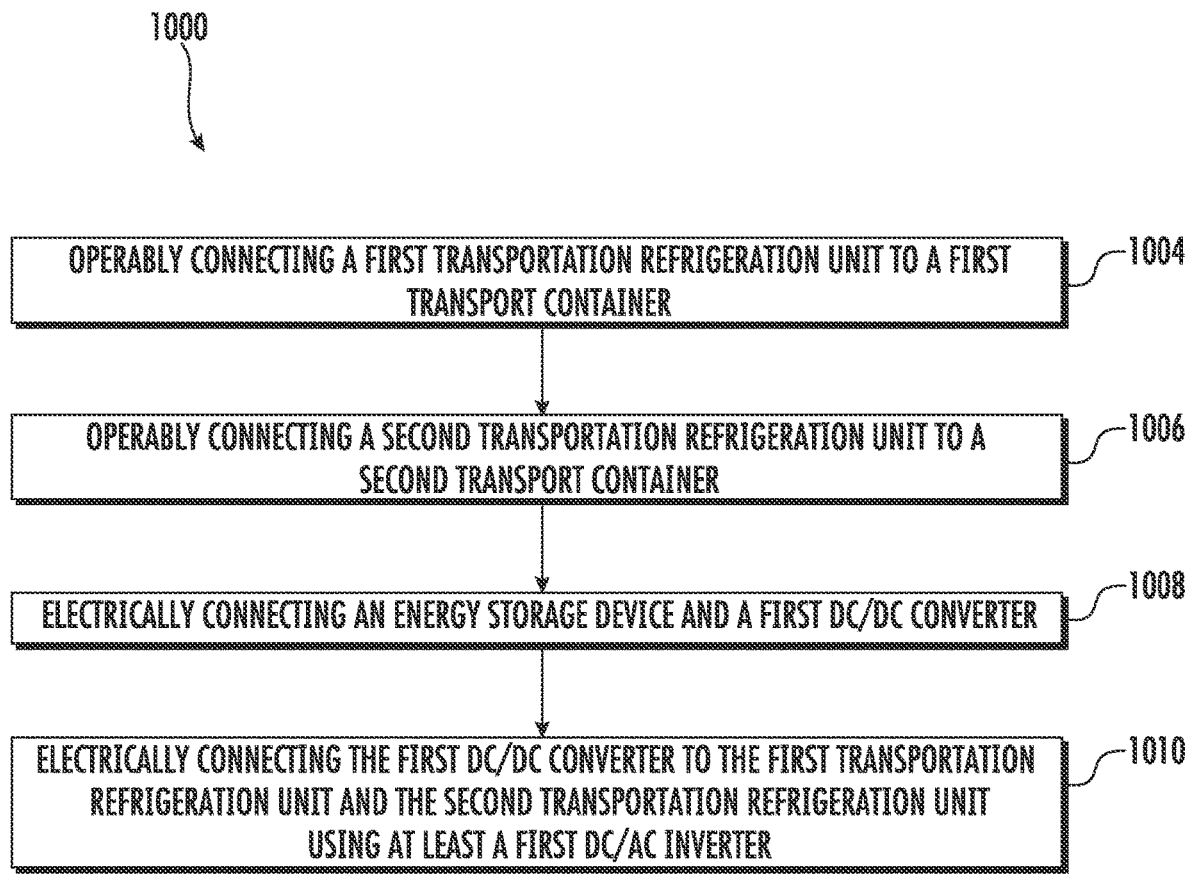
FIG. 10 is a flow process illustrating a method of assembling the multi-unit transport refrigeration system of FIG. 1, according to an embodiment of the present disclosure.

Referring now to FIG. 10, with continued reference to FIGS. 4-6. FIG. 10 shows a flow process illustrating a method 1000 of assembling a multi-unit transport refrigeration system 100, according to an embodiment of the present disclosure.

At block 1004, a first transportation refrigeration unit 22a is operably connected to a first transport container 106a. The first transportation refrigeration unit 22a configured to refrigerate the first transport container 106a. At block 1006, a second transportation refrigeration unit 22b is operably connected to a second transport container 106b. The second transportation refrigeration unit 22b configured to refrigerate the second transport container 106b. At block 1008, an energy storage device 350 is electrically connected to a first DC/DC converter 372. The first DC/DC converter 372 being configured to increase a voltage of the electricity received from the energy storage device 350 from a first voltage to a second voltage. At block 1010, the first DC/DC converter 372 is electrically connected to the first transportation refrigeration unit 22a and the second transportation refrigeration unit 22b using at least a first DC/AC inverter 374. The first DC/AC inverter 374 configured to convert the electricity received from the first DC/DC converter 372 from DC to AC and then convey the electricity to at least one of the first transportation refrigeration unit 22a or the second transportation refrigeration unit 22b.

The method 1000 may also include that the energy storage device 350 is electrically connected to the first DC/DC converter 372 using a first electrical connection 410. The method 1000 may further include that the first DC/AC inverter 374 is electrically connected to the first transportation refrigeration unit 22a using a second electrical connection 420. The method 1000 may yet further include that the first DC/AC inverter 374 is electrically connected to the second transportation refrigeration unit 22b using a third electrical connection 430 and the first DC/AC inverter 374 is electrically connected to the second electrical connection 420 and third electrical connection 430 using a junction point 510.

The method 1000 may also include that the first DC/DC converter 372 is electrically connected to the first transportation refrigeration unit 22a and the second transportation refrigeration unit 22b using the first DC/AC inverter 374 and a second DC/AC inverter 378. The second DC/AC inverter 378 is in a second circuit path 490, 690 and the first DC/AC inverter 374 is in a first circuit path 480, 680. The first DC/AC inverter 374 is configured to convey the electricity to the first transportation refrigeration unit 22a. The energy storage device 350 is electrically connected to the first DC/DC converter 372 using a first electrical connection 410 and the first DC/DC converter 372 is electrically connected to the first DC/AC inverter 374 and the second DC/AC inverter 378 using a junction point 610. The method 1000 may yet further provide that the first DC/AC inverter 374 is electrically connected to the first transportation refrigeration unit 22a using a second electrical connection 420 and the second DC/AC inverter 378 is electrically connected to the second transportation refrigeration unit 22b using a third electrical connection 430.

The method 1000 may additionally provide that a second DC/DC converter 376 is electrically connected to the energy storage device 350. The second DC/DC converter 376 increases the voltage of the electricity received from the energy storage device 350 from the first voltage to a third voltage. The third voltage may be equivalent to the second voltage. The second DC/DC converter 376 is in the second circuit path 490 and the first DC/DC converter 372 is in the first circuit path 480. A second DC/AC inverter 378 converts the electricity received from the second DC/DC converter 376 from DC to AC and conveying the electricity to the second transportation refrigeration unit 106b. The second DC/AC inverter 376 is in the second circuit path 490 and the first DC/AC inverter 374 is in the first circuit path 480. The first DC/AC inverter 374 is configured to convey the electricity to the first transportation refrigeration unit 106a. The energy storage device 350 is electrically connected to the first DC/DC converter 372 and the second DC/DC converter 376 using a first electrical connection 410. The energy storage device 350 is electrically connected to the first DC/DC converter 372 and the second DC/DC converter 376 using a junction point 411.

While the above description has described the flow process of FIG. 10 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media, such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A multi-unit transport refrigeration system comprising:
   a first transportation refrigeration unit configured to refrigerate a first transport container;
   a second transportation refrigeration unit configured to refrigerate a second transport container, wherein the first transport container and the second transport container are separate containers; and
   an energy management system comprising:
   an energy storage device configured to store electricity to power the first transportation refrigeration unit and the second transportation refrigeration unit; and
   a power conversion system electrically connecting the energy storage device to the first transportation refrigeration unit and the second transportation refrigeration unit, the power conversion system comprising:
   a first DC/DC converter configured to increase a voltage of the electricity received from the energy storage device from a first voltage to a second voltage; and
   a first DC/AC inverter configured to convert the electricity received from the first DC/DC converter from DC to AC and then convey the electricity to at least one of the first transportation refrigeration unit;
   a second DC/AC inverter configured to convert the electricity received from the first DC/DC converter from DC to AC and then convey the electricity to the second transportation refrigeration unit, wherein the second DC/AC inverter is in a second circuit path and the first DC/AC inverter is in a first circuit path.

2. The multi-unit transport refrigeration system of claim 1, further comprising:
   a first electrical connection electrically connecting the first DC/DC converter to the energy storage device.

3. The multi-unit transport refrigeration system of claim 1, further comprising:
   a first electrical connection electrically connecting the energy storage device to the first DC/DC converter; and
   a junction point configured to split the electricity exiting the first DC/DC converter into the first DC/AC inverter and the second DC/AC inverter.

4. The multi-unit transport refrigeration system of claim 3, further comprising:
   a second electrical connection electrically connecting the first DC/AC inverter to the first transportation refrigeration unit; and a third electrical connection electrically connecting the second DC/AC inverter to the second transportation refrigeration unit.

5. A multi-unit transport refrigeration system comprising:
a first transportation refrigeration unit configured to refrigerate a first transport container;
a second transportation refrigeration unit configured to refrigerate a second transport container, wherein the first transport container and the second transport container are separate containers; and
an energy management system comprising:
an energy storage device configured to store electricity to power the first transportation refrigeration unit and the second transportation refrigeration unit; and
a power conversion system electrically connecting the energy storage device to the first transportation refrigeration unit and the second transportation refrigeration unit, the power conversion system comprising:
a first DC/DC converter configured to increase a voltage of the electricity received from the energy storage device from a first voltage to a second voltage; and
a first DC/AC inverter configured to convert the electricity received from the first DC/DC converter from DC to AC and then convey the electricity to the first transportation refrigeration unit;
a second DC/DC converter configured to increase the voltage of the electricity received from the energy storage device from the first voltage to a third voltage, wherein the second DC/DC converter is in a second circuit path and the first DC/DC converter is in a first circuit path; and
a second DC/AC inverter configured to convert the electricity received from the second DC/DC converter from DC to AC and then convey the electricity to the second transportation refrigeration unit, wherein the second DC/AC inverter is in the second circuit path and the first DC/AC inverter is in the first circuit path.

6. The multi-unit transport refrigeration system of claim 5, further comprising:
a first electrical connection electrically connecting the energy storage device to the first DC/DC converter and the second DC/DC converter; and
a junction point configured to split the electricity exiting the energy storage device into the first DC/DC converter and the second DC/DC converter.

7. The multi-unit transport refrigeration system of claim 6, further comprising:
a second electrical connection electrically connecting the first DC/AC inverter to the first transportation refrigeration unit; and
a third electrical connection electrically connecting the second DC/AC inverter to the second transportation refrigeration unit.

8. A method of operating a multi-unit transport refrigeration system, the method comprising:
refrigerating a first transport container using a first transportation refrigeration unit;
refrigerating a second transport container using a second transportation refrigeration unit, wherein the first transport container and the second transport container are separate containers;
storing electricity to power the first transportation refrigeration unit and the second transportation refrigeration unit using an energy storage device;
increasing, using a first DC/DC converter, a voltage of the electricity received from the energy storage device from a first voltage to a second voltage; and
converting, using a first DC/AC inverter, the electricity received from the first DC/DC converter from DC to AC and conveying the electricity to the first transportation refrigeration unit;
converting, using a second DC/AC inverter, the electricity received from the first DC/DC converter from DC to AC and conveying the electricity to the second transportation refrigeration unit, wherein the second DC/AC inverter is in a second circuit path and the first DC/AC inverter is in a first circuit path.

9. The method of claim 8, further comprising:
conveying the electricity from the energy storage device to the first DC/DC converter using a first electrical connection.

10. The method of claim 9, further comprising:
conveying the electricity from the energy storage device to the first DC/DC converter using a first electrical connection; and
splitting the electricity exiting the first DC/DC converter into the first DC/AC inverter and the second DC/AC inverter using a junction point.

11. The method of claim 10, further comprising:
conveying the electricity from the first DC/AC inverter to the first transportation refrigeration unit using a second electrical connection; and
conveying the electricity from the second DC/AC inverter to the second transportation refrigeration unit using a third electrical connection.

12. A method of operating a multi-unit transport refrigeration system, the method comprising:
refrigerating a first transport container using a first transportation refrigeration unit
refrigerating a second transport container using a second transportation refrigeration unit, wherein the first transport container and the second transport container are separate containers;
storing electricity to power the first transportation refrigeration unit and the second transportation refrigeration unit using an energy storage device;
increasing, using a first DC/DC converter, a voltage of the electricity received from the energy storage device from a first voltage to a second voltage; and
converting, using a first DC/AC inverter, the electricity received from the first DC/DC converter from DC to AC and conveying the electricity to the first transportation refrigeration unit;
increasing, using a second DC/DC converter, the voltage of the electricity received from the energy storage device from the first voltage to a third voltage, wherein the second DC/DC converter is in a second circuit path and the first DC/DC converter is in a first circuit path; and
converting, using a second DC/AC inverter, the electricity received from the second DC/DC converter from DC to AC and conveying the electricity to the second transportation refrigeration unit, wherein the second DC/AC inverter is the second circuit path and the first DC/AC inverter is in the first circuit path.

13. The method of claim 12, further comprising:
conveying the electricity from the energy storage device to the first DC/DC converter and the second DC/DC converter using a first electrical connection; and
splitting, using a junction point, the electricity exiting the energy storage device into the first DC/DC converter and the second DC/DC converter.

14. The method of claim 13, further comprising:
conveying the electricity from the first DC/AC inverter to the first transportation refrigeration unit using a second electrical connection; and
conveying the electricity from the second DC/AC inverter to the second transportation refrigeration unit using a third electrical connection.

\* \* \* \* \*